United States Patent
Chung et al.

(10) Patent No.: US 8,097,174 B2
(45) Date of Patent: Jan. 17, 2012

(54) MEMS DEVICE AND INTERCONNECTS FOR SAME

(75) Inventors: Wonsuk Chung, San Jose, CA (US); SuryaPrakash Ganti, Los Altos, CA (US); Stephen Zee, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 12/764,454

(22) Filed: Apr. 21, 2010

(65) Prior Publication Data
US 2010/0202038 A1    Aug. 12, 2010

Related U.S. Application Data

(62) Division of application No. 11/613,922, filed on Dec. 20, 2006, now Pat. No. 7,706,042.

(51) Int. Cl.
*B44C 1/22* (2006.01)
*C23F 1/00* (2006.01)

(52) U.S. Cl. ............... 216/2; 216/24; 216/41; 216/58; 216/83

(58) Field of Classification Search ............. 216/2, 24, 216/41, 58, 83
See application file for complete search history.

(56) References Cited

U.S. PATENT DOCUMENTS

| | | |
|---|---|---|
| 4,666,254 A | 5/1987 | Itoh et al. |
| 4,681,403 A | 7/1987 | te Velde et al. |
| 4,710,732 A | 12/1987 | Hornbeck |
| 5,018,256 A | 5/1991 | Hornbeck |
| 5,028,939 A | 7/1991 | Hornbeck et al. |
| 5,078,479 A | 1/1992 | Vuilleumier |
| 5,083,857 A | 1/1992 | Hornbeck |
| 5,233,456 A | 8/1993 | Nelson |
| 5,312,512 A | 5/1994 | Allman et al. |
| 5,461,411 A | 10/1995 | Florence et al. |
| 5,488,505 A | 1/1996 | Engle |
| 5,499,037 A | 3/1996 | Nakagawa et al. |
| 5,610,624 A | 3/1997 | Bhuva |
| 5,622,814 A | 4/1997 | Miyata et al. |
| 5,633,652 A | 5/1997 | Kanbe et al. |
| 5,650,834 A | 7/1997 | Nakagawa et al. |
| 5,801,084 A | 9/1998 | Beasom et al. |
| 6,040,937 A | 3/2000 | Miles |
| 6,097,145 A | 8/2000 | Kastalsky et al. |

(Continued)

FOREIGN PATENT DOCUMENTS

EP    1 243 550    9/2002

(Continued)

OTHER PUBLICATIONS

Butler et al., An Embedded Overlay Concept for Microsystems Packaging, IEEE Transactions on Advanced Packaging IEEE USA, 23(4):617-622 (2000).

(Continued)

*Primary Examiner* — Shamim Ahmed
(74) *Attorney, Agent, or Firm* — Knobbe Martens Olson & Bear LLP

(57) ABSTRACT

A microelectromechanical systems device having an electrical interconnect connected to at least one of an electrode and a movable layer within the device. At least a portion of the electrical interconnect is formed from the same material as a movable layer of the device. A thin film, particularly formed of molybdenum, is provided underneath the electrical interconnect. The movable layer preferably comprises aluminum.

13 Claims, 14 Drawing Sheets

U.S. PATENT DOCUMENTS

| | | |
|---|---|---|
| 6,219,015 B1 | 4/2001 | Bloom et al. |
| 6,248,654 B1 | 6/2001 | Lee et al. |
| 6,337,027 B1 * | 1/2002 | Humphrey ........................ 216/2 |
| 6,356,254 B1 | 3/2002 | Kimura |
| 6,392,781 B1 | 5/2002 | Kim et al. |
| 6,436,504 B2 | 8/2002 | Miyamoto et al. |
| 6,452,124 B1 | 9/2002 | York et al. |
| 6,452,465 B1 | 9/2002 | Brown et al. |
| 6,513,911 B1 | 2/2003 | Ozaki et al. |
| 6,525,352 B1 | 2/2003 | Muller et al. |
| 6,555,904 B1 | 4/2003 | Karpman |
| 6,624,944 B1 | 9/2003 | Wallace et al. |
| 6,653,997 B2 | 11/2003 | Van Gorkom et al. |
| 6,674,562 B1 | 1/2004 | Miles |
| 6,803,534 B1 | 10/2004 | Chen et al. |
| 6,822,628 B2 | 11/2004 | Dunphy et al. |
| 6,872,319 B2 * | 3/2005 | Tsai ................................. 216/2 |
| 6,912,022 B2 | 6/2005 | Lin et al. |
| 6,940,631 B2 | 9/2005 | Ishikawa |
| 6,980,350 B2 | 12/2005 | Hung et al. |
| 7,012,726 B1 | 3/2006 | Miles |
| 7,053,737 B2 | 5/2006 | Schwartz et al. |
| 7,064,883 B2 | 6/2006 | Payne et al. |
| 7,123,216 B1 | 10/2006 | Miles |
| 7,145,213 B1 | 12/2006 | Ebel |
| 7,161,730 B2 | 1/2007 | Floyd |
| 7,172,915 B2 | 2/2007 | Lin et al. |
| 7,221,495 B2 | 5/2007 | Miles et al. |
| 7,300,162 B2 | 11/2007 | Huibers |
| 7,309,658 B2 | 12/2007 | Lazovsky et al. |
| 7,327,510 B2 | 2/2008 | Cummings et al. |
| 7,375,404 B2 | 5/2008 | Park et al. |
| 7,385,800 B2 | 6/2008 | Morris, III et al. |
| 7,615,395 B2 | 11/2009 | Heuvelman |
| 7,706,042 B2 | 4/2010 | Chung et al. |
| 2002/0031155 A1 | 3/2002 | Tayebati et al. |
| 2002/0054422 A1 | 5/2002 | Carr et al. |
| 2002/0117728 A1 | 8/2002 | Brosnihan et al. |
| 2003/0054588 A1 | 3/2003 | Patel et al. |
| 2003/0102771 A1 | 6/2003 | Akiba et al. |
| 2003/0179527 A1 | 9/2003 | Chea |
| 2004/0008438 A1 | 1/2004 | Sato |
| 2004/0124452 A1 | 7/2004 | Wellhausen et al. |
| 2004/0140557 A1 | 7/2004 | Sun et al. |
| 2004/0150869 A1 | 8/2004 | Kasai |
| 2004/0150936 A1 | 8/2004 | Chea |
| 2004/0150939 A1 | 8/2004 | Huff |
| 2004/0166603 A1 | 8/2004 | Carley |
| 2004/0179445 A1 | 9/2004 | Park |
| 2004/0217264 A1 | 11/2004 | Wood et al. |
| 2005/0002082 A1 | 1/2005 | Miles |
| 2005/0036095 A1 | 2/2005 | Yeh et al. |
| 2005/0237743 A1 | 10/2005 | Payne et al. |
| 2006/0056001 A1 | 3/2006 | Taguchi et al. |
| 2006/0148262 A1 | 7/2006 | Lee et al. |
| 2007/0040777 A1 | 2/2007 | Cummings |
| 2010/0265563 A1 | 10/2010 | Fan et al. |

FOREIGN PATENT DOCUMENTS

| | | |
|---|---|---|
| EP | 1 640 765 | 3/2006 |
| JP | 2000-306515 | 11/2000 |
| JP | 2002-287047 | 3/2001 |
| JP | 2002-023068 | 1/2002 |
| JP | 2002-023070 | 1/2002 |
| JP | 2002-040238 | 2/2002 |
| JP | 2002 062493 | 2/2002 |
| WO | WO 01/14248 | 3/2001 |
| WO | WO 2006/110293 | 10/2006 |

OTHER PUBLICATIONS

Invitation to Pay Additional Fees in PCT/US07/025421, filed Dec. 10, 2007.

ISR and WO in PCT/US07/025421, filed Dec. 10, 2007.

IPRP in PCT/US07/025421, filed Dec. 10, 2007.

Goossen et al., Silicon Modulato r Based on Mechanically-Active Anti-Reflection Layer with 1Mbit/sec Capability for Fiber-in-the-Loop Applications, IEEE Photonics Technology Letters, pp. 1119-1121 (Sep. 1994).

Gosch, West Germany Grabs the Lead in X -Ray Lithography, Electronics, pp. 78-80 (Feb. 5, 1987).

Jerman et al., A Miniature Fabry -Perot Interferometer Fabricated Using Silicon Micromachining Techniques, IEEE Electron Devices Society (1988).

* cited by examiner

|  | +V_bias | -V_bias |
|---|---|---|
| 0 | Stable | Stable |
| +ΔV | Relax | Actuate |
| −ΔV | Actuate | Relax |

Column Output Signals / Row Output Signals

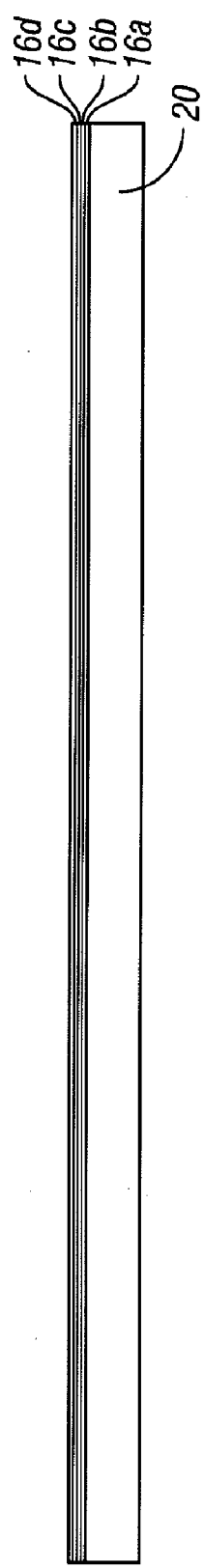
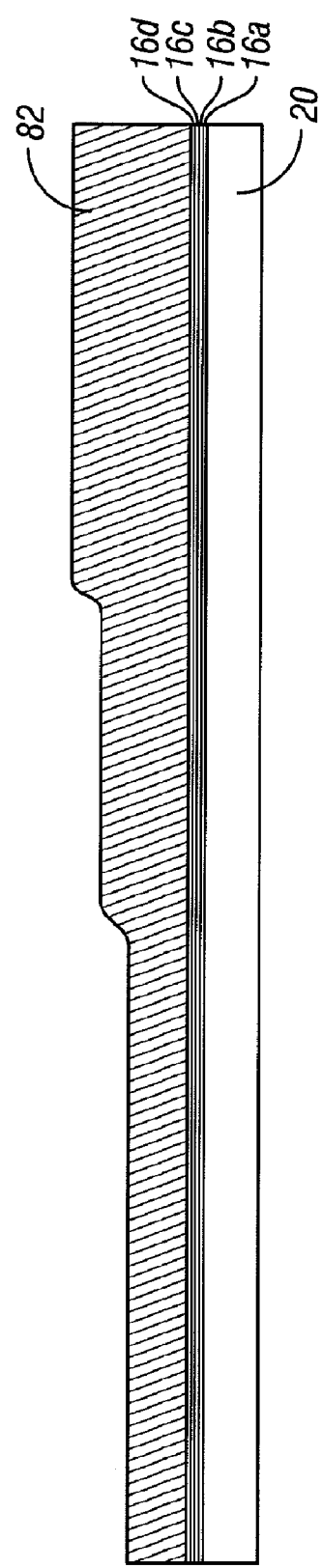

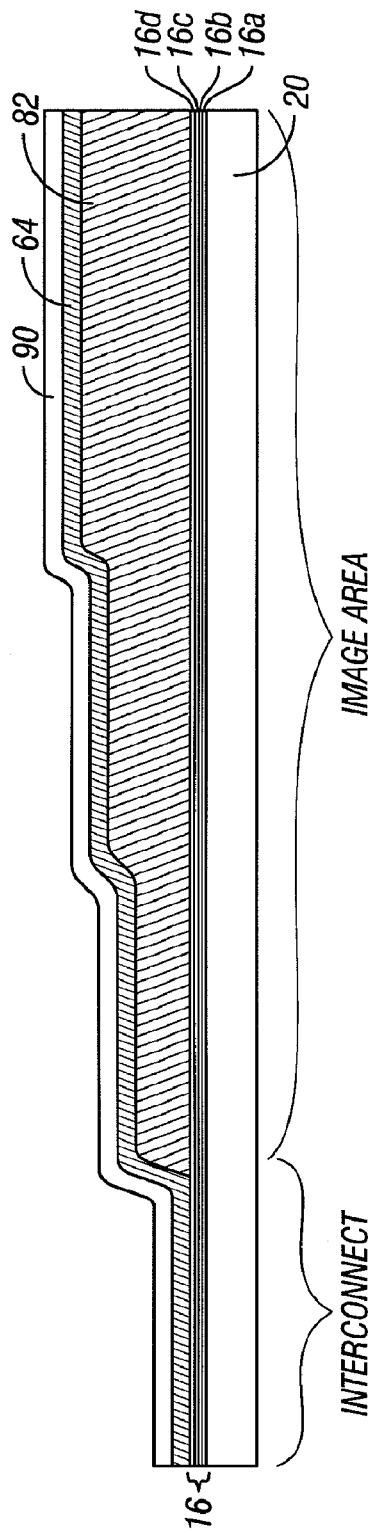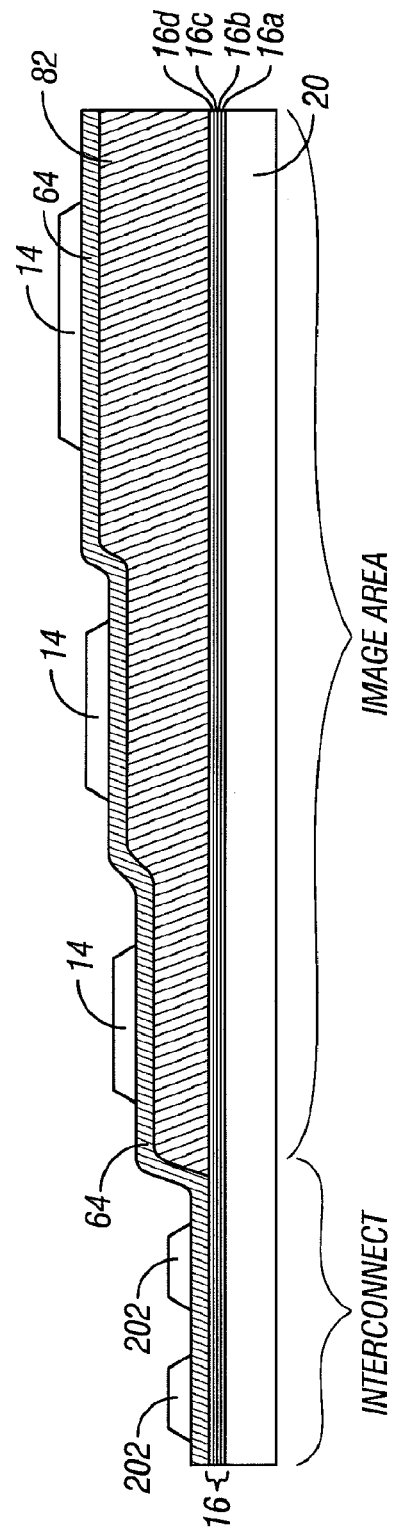

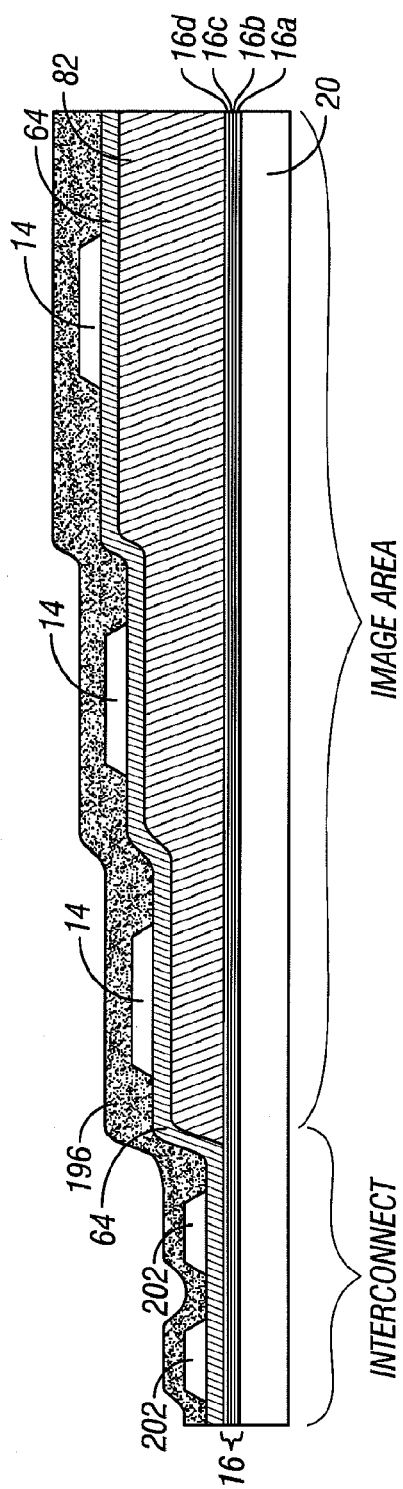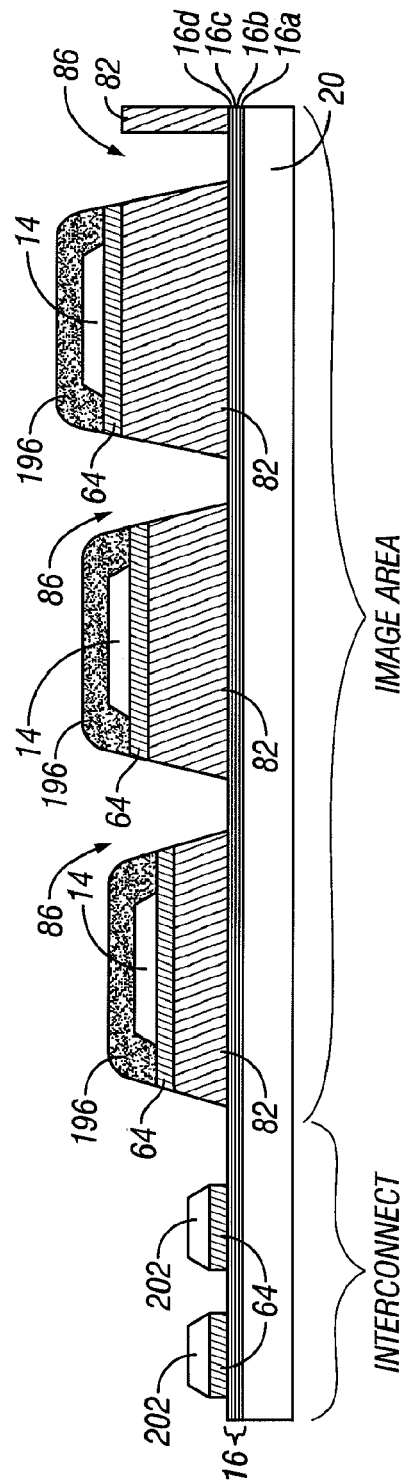
FIG. 8G
FIG. 8H

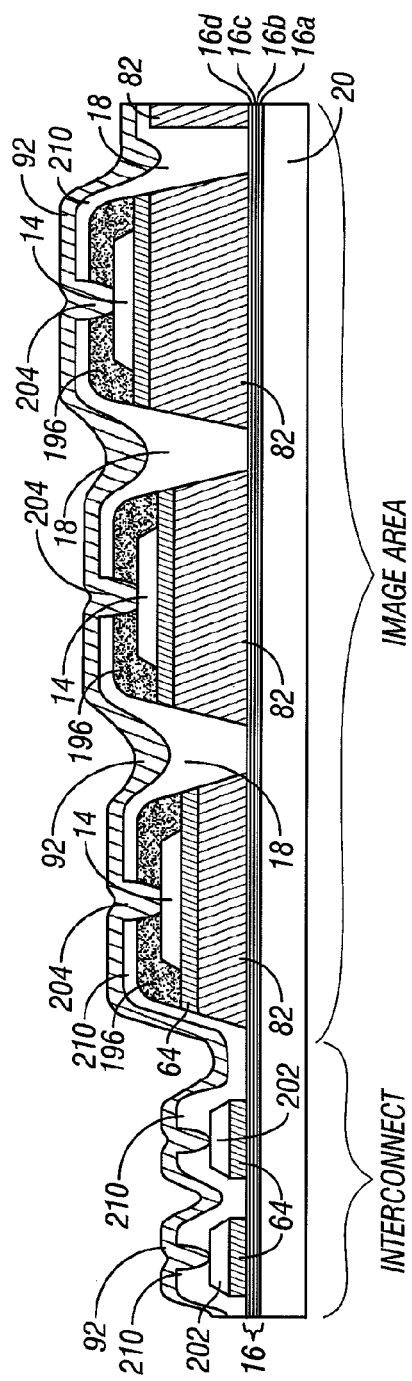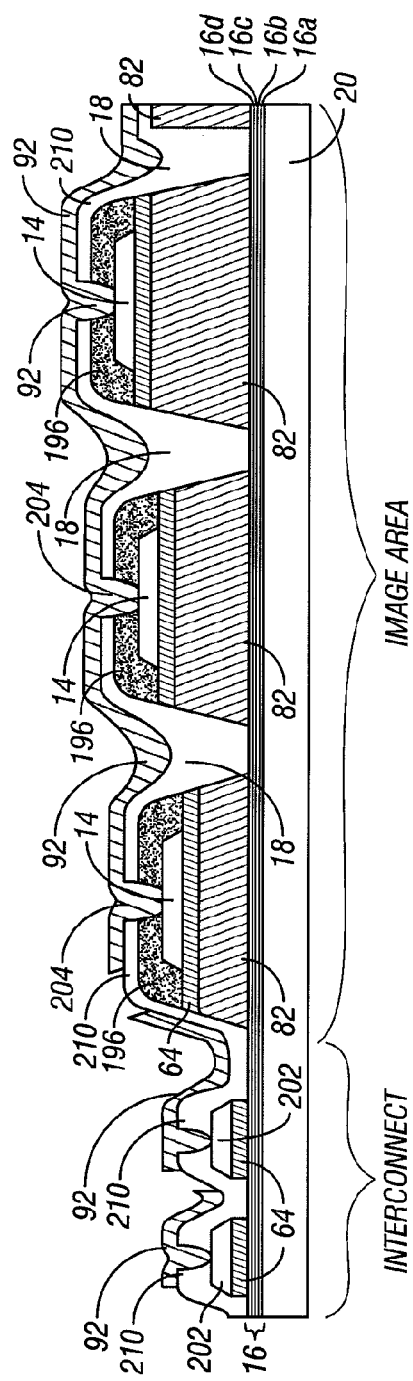

MEMS DEVICE AND INTERCONNECTS FOR SAME

CROSS-REFERENCE TO RELATED APPLICATIONS

This application is a divisional of U.S. patent application Ser. No. 11/613,922, filed Dec. 20, 2006, now U.S. Pat. No. 7,706,042, the disclosure of which is incorporated herein by reference.

BACKGROUND

1. Field

The field of the invention relates to microelectromechanical systems (MEMS). More specifically, the field of the invention relates to fabricating electrical interconnects for MEMS.

2. Description of the Related Technology

Microelectromechanical systems (MEMS) include micro mechanical elements, actuators, and electronics. Micromechanical elements may be created using deposition, etching, and/or other micromachining processes that remove parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

An embodiment provides a microelectromechanical systems device including a lower electrode, a movable conductive layer, a cavity between the electrode and the movable conductive layer, and an electrical interconnect connected to at least one of the lower electrode and the movable conductive layer. The electrical interconnect and the movable conductive layer are formed of a same material and the electrical interconnect layer is formed directly over a thin film that is etchable by fluorine-based etchants.

According to another embodiment, a method is provided for forming a microelectromechanical systems device. An electrode in an array region is provided. A sacrificial layer is deposited over the electrode in the array region. A thin film is deposited over the sacrificial layer and in an interconnect region. A movable layer is formed over the thin film. An electrical interconnect layer is over the thin film in the interconnect region, wherein the electrical interconnect layer comprises a same material as the movable layer.

According to yet another embodiment, a microelectromechanical systems device is provided. The device includes a first means for conducting, a second means for conducting, and a cavity between the first means for conducting and the second means for conducting. The second means for conducting comprises a movable layer. The device also includes an interconnect means for electrically communicating between circuitry outside the device and at least one of the first and second means for conducting. The interconnect means and the second means for conducting are formed of a same material and the interconnect means is formed directly over a thin film that is etchable by fluorine-based etchants.

BRIEF DESCRIPTION OF THE DRAWINGS

These and other aspects of the invention will be readily apparent from the following description and from the appended drawings (not to scale), which are meant to illustrate and not to limit the invention, and wherein.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

According to embodiments described herein, a microelectromechanical systems (MEMS) device and method for making the device are provided. The device includes an electrical interconnect connected to at least one of an electrode and a movable layer (e.g., aluminum used as a reflector in an interferometric modulator) within the device. At least a portion of the electrical interconnect is formed from the same material as the movable layer of the device. A thin film, preferably a material susceptible to the release etch that will remove the sacrificial material from under the movable electrode, is provided under the electrical interconnect.

Figure 1:
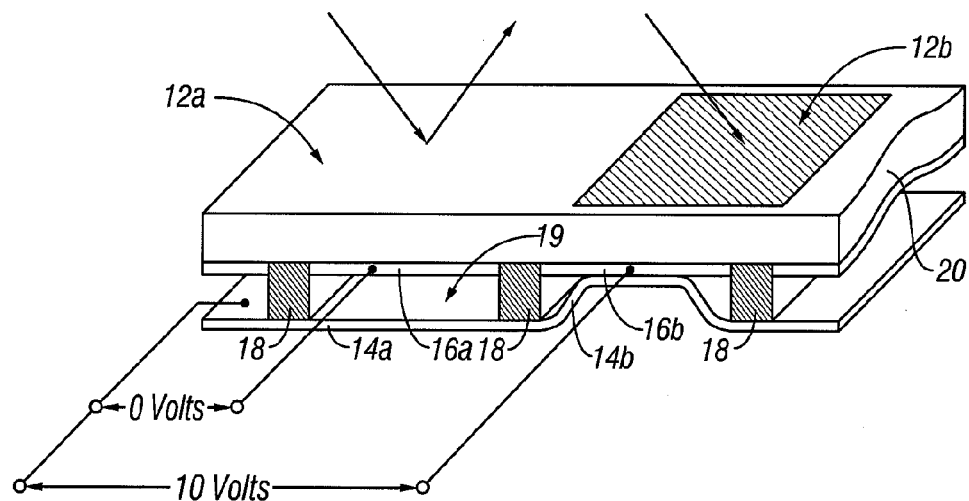
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
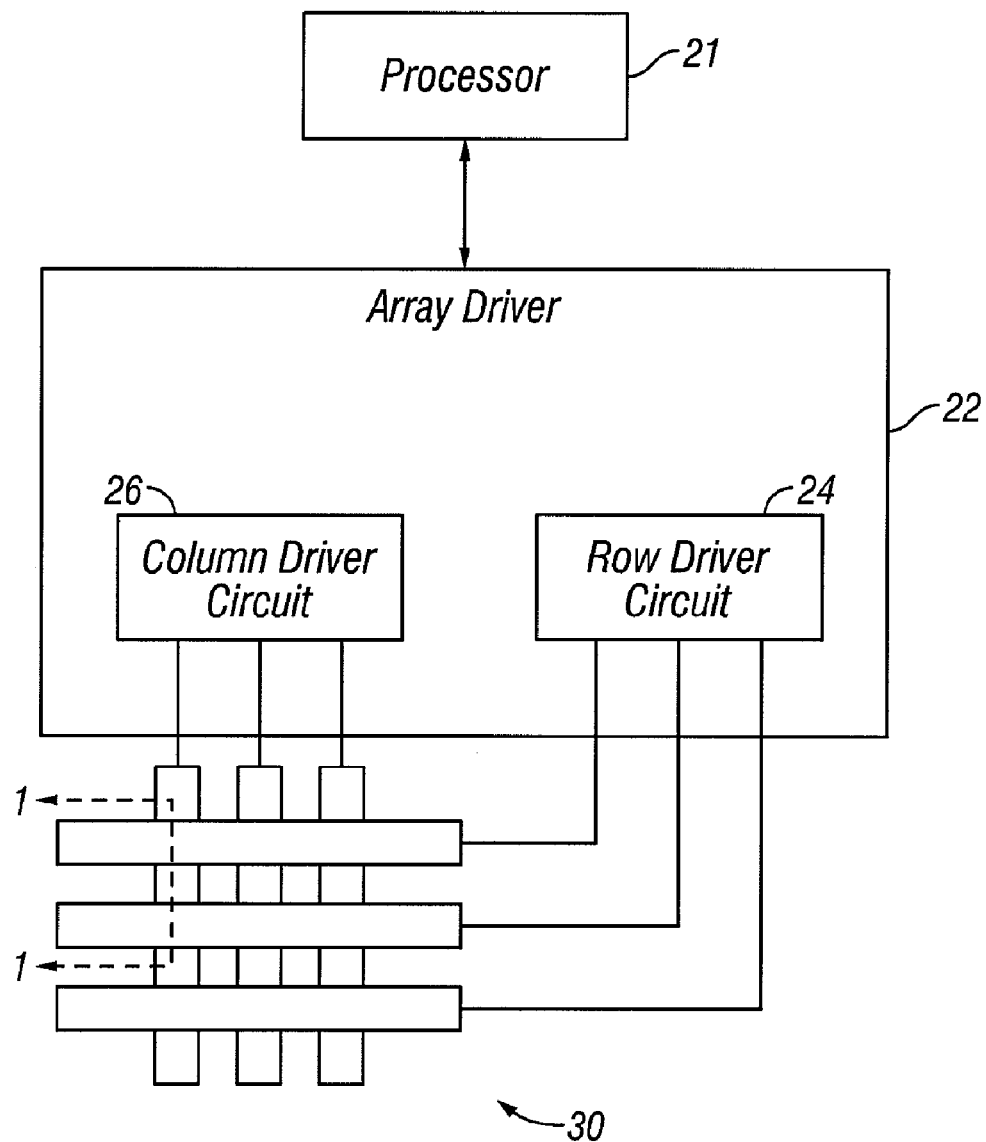
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
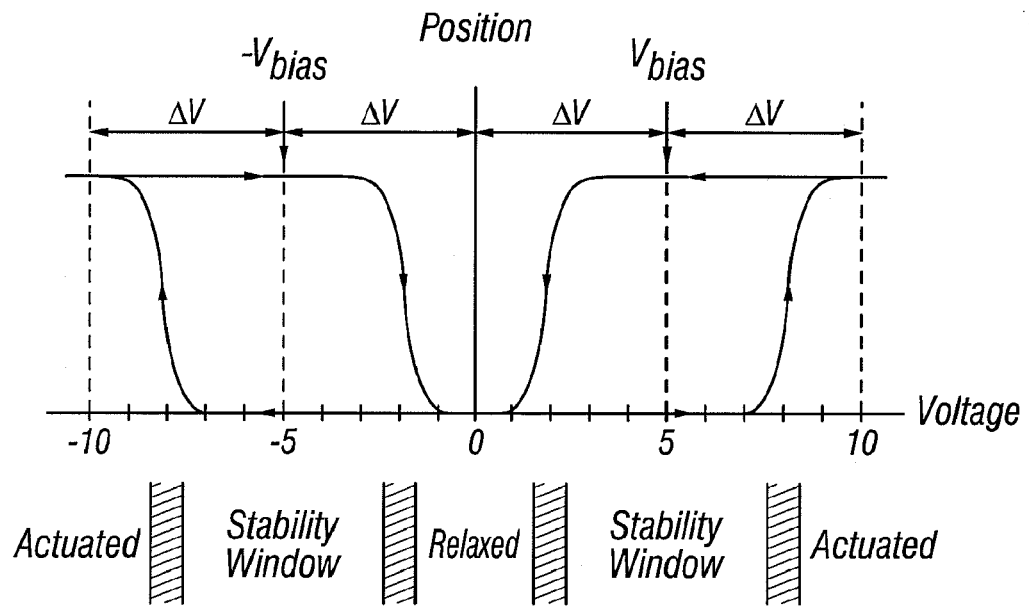
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
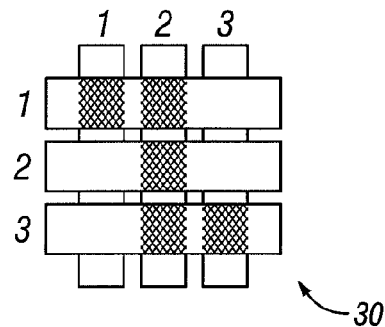
FIGS. 5A and 5B illustrate one exemplary timing diagram for row and column signals that may be used to write a frame of display data to the 3×3 interferometric modulator display of FIG. 2.
Figure 5B:
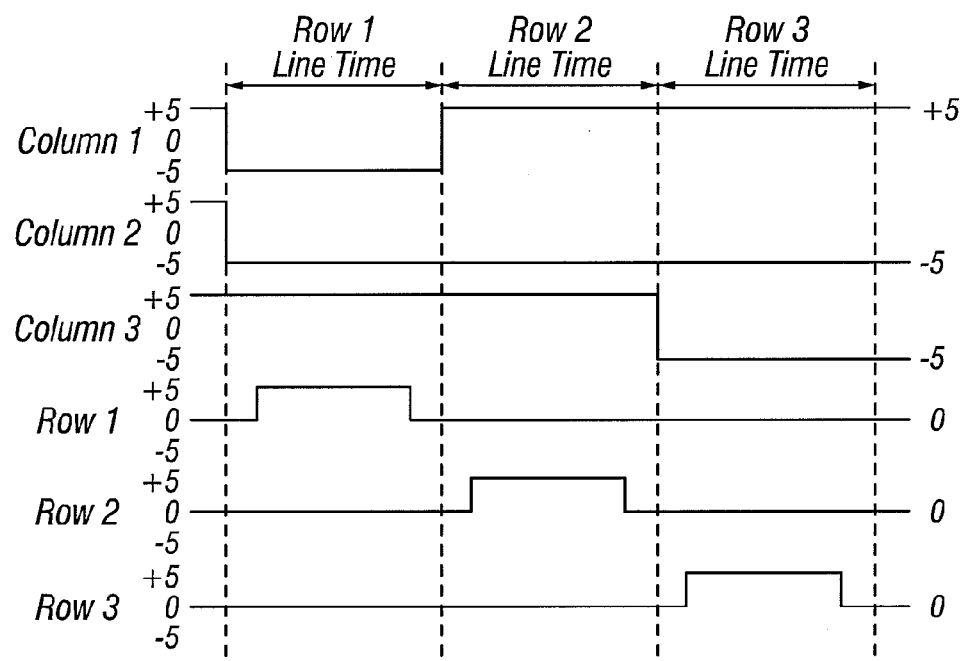

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts, respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
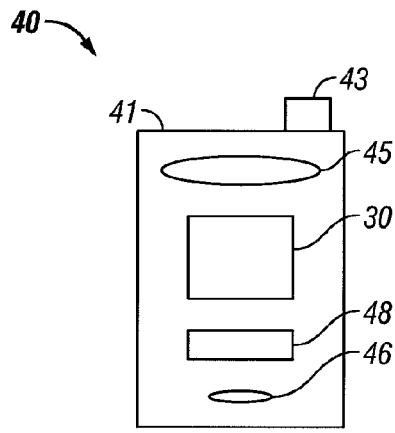
FIGS. 6A and 6B are system block diagrams illustrating an embodiment of a visual display device comprising a plurality of interferometric modulators.
Figure 6B:
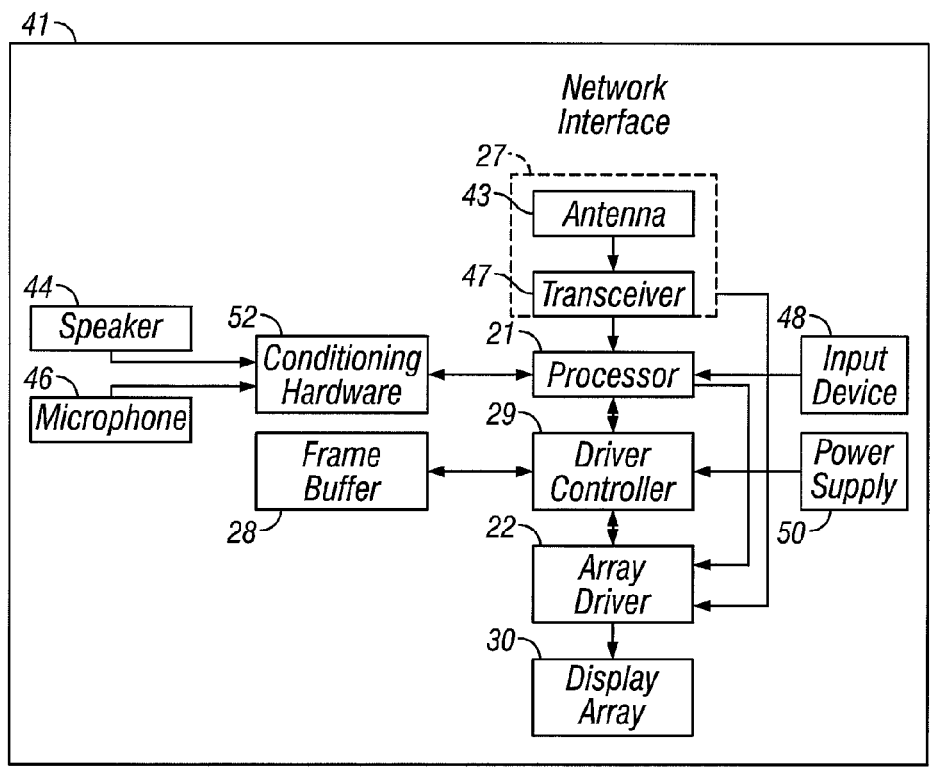

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of the exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, the network interface 27 can be replaced by an image source, which can store or generate image data to be sent to the processor 21. For example, the image source can be a digital video disc (DVD) or a hard-disc drive that contains image data, or a software module that generates image data.

The processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to the frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. The conditioning hardware 52 generally includes amplifiers and filters for transmitting signals to the speaker 45, and for receiving signals from the microphone 46. The conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, the driver controller 29 is a conventional display controller or a bi-stable display controller (e.g., an interferometric modulator controller). In another embodiment, the array driver 22 is a conventional driver or a bi-stable display driver (e.g., an interferometric modulator display). In one embodiment, the driver controller 29 is integrated with the array driver 22. Such an embodiment is common in highly integrated systems such as cellular phones, watches, and other small area displays. In yet another embodiment, the display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

The power supply 50 can include a variety of energy storage devices as are well known in the art. For example, in one embodiment, the power supply 50 is a rechargeable battery, such as a nickel-cadmium battery or a lithium ion battery. In another embodiment, the power supply 50 is a renewable energy source, a capacitor, or a solar cell including a plastic solar cell, and solar-cell paint. In another embodiment, the power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
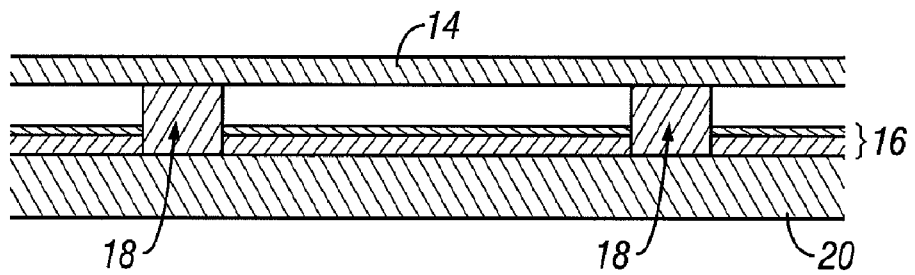
FIG. 7A is a cross section of the device of FIG. 1.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. The supports 18 can comprise isolated posts or continuous walls. For example, the supports 18 can include linear rails that support crossing strips of mechanical or movable material, and/or isolated posts. In one example, rails provide primary support and posts within each cavity serve to stiffen the mechanical layer.

Figure 7B:
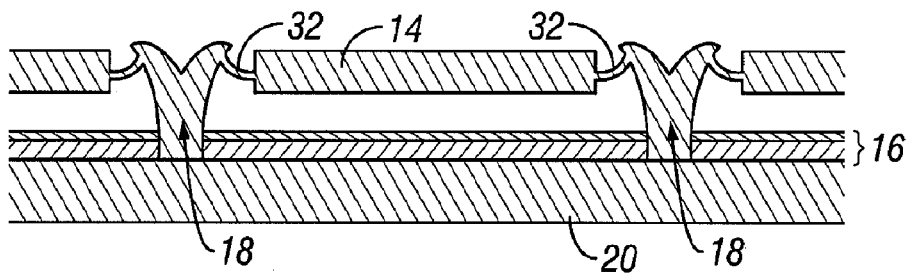
FIG. 7B is a cross section of an alternative embodiment of an interferometric modulator.
Figure 7C:
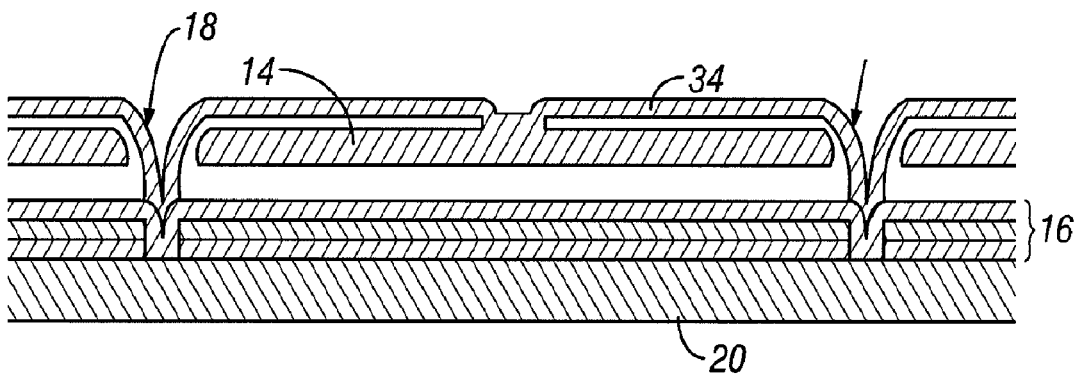
FIG. 7C is a cross section of another alternative embodiment of an interferometric modulator.

In FIG. 7B, the moveable reflective layer 14 is attached to supports at the corners only, on tethers 32. In FIG. 7C, the moveable reflective layer 14 is suspended from a deformable mechanical layer 34, which may comprise a flexible metal. The deformable mechanical layer 34 connects, directly or indirectly, to the substrate 20 around the perimeter of the deformable mechanical layer 34. These connections are herein referred to as support structures or supports 18. The embodiment illustrated in FIG. 7D has supports 18 that include post plugs 42 upon which the deformable layer 34 rests. The movable reflective layer 14 remains suspended over the gap, as in FIGS. 7A-7C, but the mechanical layer 34 does not form the support posts by filling holes between the mechanical layer 34 and the optical stack 16. Rather, supports 18 are separately deposited under the mechanical layer 34. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7A-7E, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable mechanical layer 34. This allows the structural design and materials used for the reflective layer 14 to be optimized with respect to the optical properties, and the structural design and materials used for the deformable layer 34 to be optimized with respect to desired mechanical properties.

Layers, materials, and/or other structural elements may be described herein as being "over," "above," "between," etc. in relation to other structural elements. As used herein, these terms can mean directly or indirectly on, over, above, between, etc., as a variety of intermediate layers, material, and/or other structural elements can be interposed between structural elements described herein. Similarly, structural elements described herein, such as substrates or layers, can comprise a single component (e.g., a monolayer) or a multi-component structure (e.g., a laminate comprising multiple layers of the recited material, with or without layers of additional materials). Use of the term "one or more" with respect to an object or element does not, in any way, indicate the absence of a potential plural arrangement of objects or elements for which the term is not used. The term "microelectromechanical device," as used herein, refers generally to any such device at any stage of manufacture.

Methods disclosed herein employ depositions of conductive layers for use in the MEMS array to simultaneously form peripheral electrical interconnect or routing. In some options for forming a microelectromechanical system (e.g., an interferometric modulator), depositions that form the deformable mechanical layer 34 and/or the electrodes of the optical stack 16, can also be used to provide electrical interconnect and routing in the periphery of the display, where the interconnect is between circuitry outside the array (e.g., driver chip(s) at a contact pad) and an electrode (row or column) within the array.

Figure 7D:
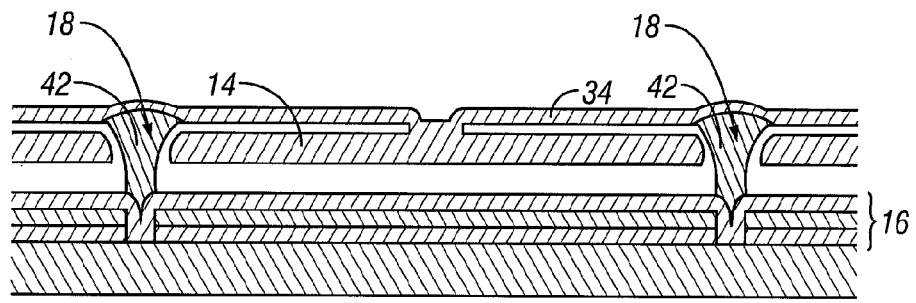
FIG. 7D is a cross section of yet another alternative embodiment of an interferometric modulator.
Figure 7E:
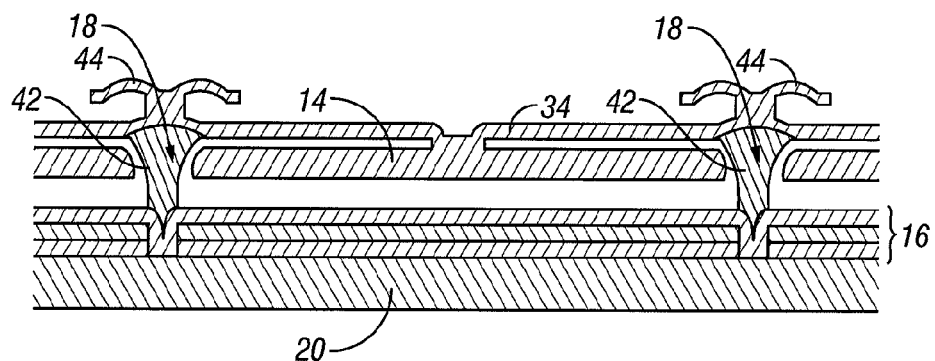
FIG. 7E is a cross section of an additional alternative embodiment of an interferometric modulator.

As discussed above, certain embodiments of MEMS devices, and in particular interferometric modulators, comprise a movable layer comprising a reflective layer that is partially detached from a mechanical or deformable layer (e.g., FIGS. 7C-7E). An exemplary process will be described with reference to FIGS. 8A-8N. It will be understood that FIGS. 8A-8N are cross-sectional views of the row electrodes of the device. According to this embodiment, the peripheral routing/interconnect is formed from the same material that is used to form the reflective layer (e.g., aluminum mirror) in the movable layer within the MEMS device, and preferably formed from the same deposition.

With reference to FIG. 8A, an optical stack 16 is formed over the transparent substrate 20 in one embodiment. The ITO 16a of the optical stack 16 may be deposited by standard deposition techniques, including chemical vapor deposition (CVD) or sputtering. A relatively thin absorber layer 16b of, e.g., MoCr or Cr, is preferably deposited over the ITO 16a. The ITO 16a and MoCr or Cr 16b are then etched and patterned into rows to form the electrodes of the optical stack 16. As described above, the optical stack 16 includes a dielectric layer 16c (e.g., silicon dioxide ($SiO_2$)) to provide electrical isolation during operation between the row electrodes and subsequently deposited column electrodes. The dielectric layer 16c can be deposited before or after patterning the row electrodes. The silicon dioxide 16c may be covered with an aluminum oxide ($Al_2O_3$) cap layer 16d to protect it from the release etch performed later in the fabrication sequence. In some arrangements, a further etch stop is formed over the $Al_2O_3$ layer 16d to protect it during subsequent patterning steps to define multiple thicknesses of sacrificial material to define multiple cavity sizes and corresponding colors.

As shown in FIG. 8B, a sacrificial layer (or layers) 82, preferably comprising a material that can be selectively etched by fluorine-based etchants, and particularly molybdenum (Mo), is deposited (and later partially removed in the release etch) over the structure. The sacrificial layer 82 preferably comprises a metal that is selectively etchable, relative to the dielectric of the optical stack 16 and other exposed metals of the MEMS device. In certain embodiments, this sacrificial layer 82 may comprise, for example, tungsten (W), titanium (Ti), or amorphous silicon.

Figure 8C:
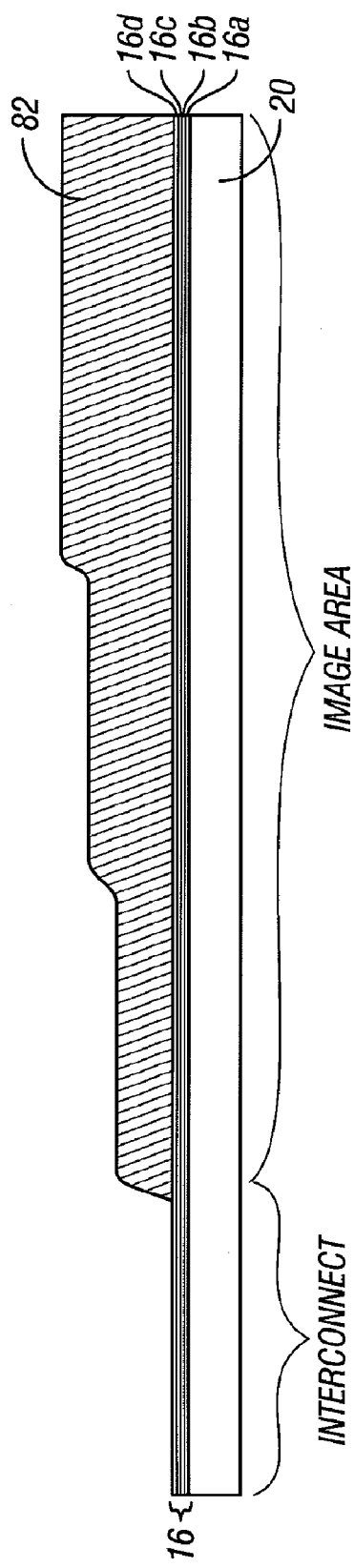
FIGS. 8A-8N are cross sections showing a process for making an embodiment of an interferometric modulator.

As illustrated in FIG. 8C, according to this embodiment, the sacrificial layer 82 is patterned such that it remains only in the image (or "array" or "display") area. It will be understood that the sacrificial material 82 is preferably deposited (and later selectively removed) over the optical stack 16 to define a resonant optical cavity 19 (FIG. 8M) between the optical stack 16 and a movable layer that will be deposited, as described in more detail below. It will be understood that the sacrificial layer 82 may comprise multiple layers that are deposited and subsequently patterned to form a sacrificial layer 82 having multiple thicknesses to produce interferometric modulators for reflecting multiple different colors, such as red, green, and blue for an RGB display system. As shown in FIGS. 8B and 8C, the sacrificial layer 82 has varying thicknesses. The skilled artisan will understand that these varying thicknesses correspond to varying heights of the cavity 19 (FIG. 8M) that is formed when the sacrificial layer 82 is removed, as will be described below. In the process of forming the three different heights, the thinnest of the three illustrated portions of the sacrificial layer can be formed from a single deposited layer; the intermediate thickness formed from two depositions; and the thickest portion formed from three depositions. Etch stop layers can optionally intervene between the depositions. In an exemplary embodiment, a modulator having a cavity with the largest height (formed by a sacrificial layer having the greatest thickness) reflects red light, a modulator having a cavity with an intermediate height (formed by a sacrificial layer having an intermediate thickness) reflects green light, and a modulator having a cavity with the smallest height (formed by a sacrificial layer having the smallest thickness) reflects blue light. For simplicity, the sacrificial layer 82 is shown as a single layer in the figures.

Figure 8D:
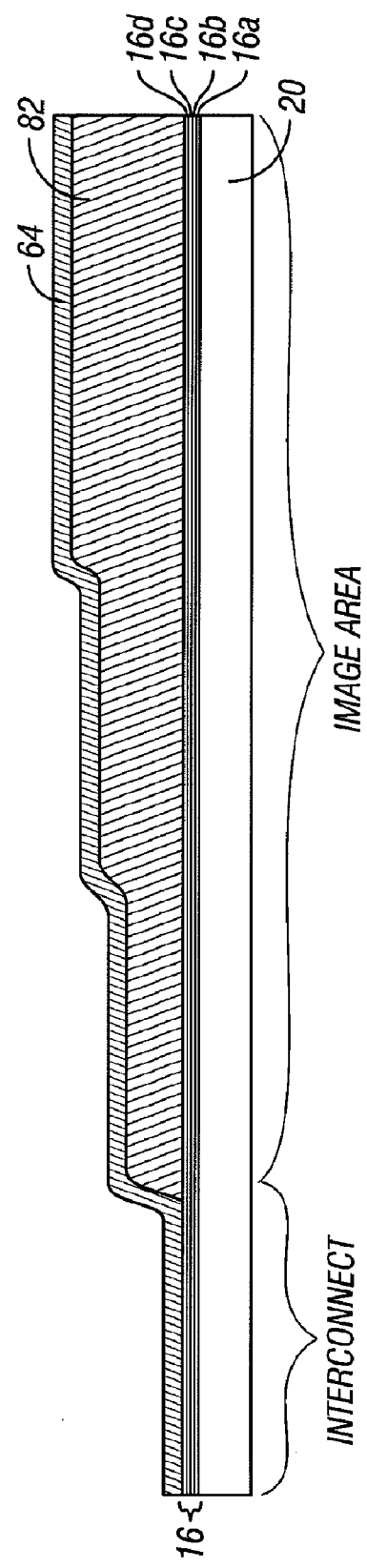

In this embodiment, as shown in FIG. 8D, a thin film 64 is deposited over the entire structure, including the interconnect region. The thin film 64 is preferably selectively etchable by the same etchant that removes the sacrificial layer, and is more preferably formed of the same material as the sacrificial layer 82. In a preferred embodiment, both the thin film 64 and the sacrificial layer 82 are formed of molybdenum. Preferably, the thin film 64 has a thickness in the range of about 50 Å-500 Å, more preferably in the range of about 80 Å-200 Å, and even more preferably is about 100 Å thick. As will described below, this thin film 64 can also function as a barrier layer in the interconnect region. Although the thin film 64 is illustrated as being deposited over the entire structure, as shown in FIG. 8D, it will be understood that, in alternative embodiments, the thin film 64 is deposited only in the interconnect region. Thus, it will be understood that the thin film 64 is deposited at least in the interconnect region.

As shown in FIG. 8E, a conductive layer 90, preferably a reflective layer, is deposited over the thin film 64 to form the movable electrodes 14 of the interferometric modulator and at least a portion of the electrical interconnect or routing 202 (FIG. 8F). As will be described in more detail below, the interconnect or routing 202 electrically connects circuitry on a contact pad outside the array with either the row electrode (e.g., ITO of the optical stack 16) or the patterned electrode 14 or both.

For the preferred interferometric modulator embodiment, the conductive layer 90 is preferably formed of a specular metal material, such as aluminum or an aluminum alloy, such that it will be referred to herein as a reflective layer, and the patterned movable electrode will be referred to as the patterned mirror 14. According to certain embodiments, the reflective layer 90 comprises a single layer of reflective material. In other embodiments, the reflective layer 90 may comprise a thin layer of reflective material with a layer of more rigid material (not shown) overlying the thin layer of reflective material. As the reflective layer of this embodiment will be partially detached from an overlying mechanical layer (FIGS. 8M and 8N) in the image area, the reflective layer 90 preferably has sufficient rigidity to remain in a substantially flat position relative to the optical stack 16 even when partially detached, and the inclusion of a stiffening layer on the side of the reflective layer located away from the optical stack can be used to provide the desired rigidity.

After the reflective layer 90 is deposited, it is patterned and etched, as shown in FIG. 8F. The reflective layer 90 is patterned into columns orthogonal to the row electrodes of the optical stack 16 to create the row/column array described above. These columns form the patterned mirror layer 14 in the image area. According to an embodiment, the reflective layer 90 is patterned at the same time in the peripheral areas to form the electrical interconnect or routing 202 in the periphery of the display, where the interconnect is between circuitry outside the array and an electrode within the array. The skilled artisan will appreciate that in some embodiments, the reflective layer 90 is patterned simultaneously to form both the electrical interconnect/routing 202 and the patterned mirror layer 14. In other embodiments, the patterned mirror layer 14 and the electrical interconnect/routing 202 may be patterned in separate steps. It will also be understood that although, the electrical interconnect/routing 202 and the patterned mirror layer 14 are formed from a single deposited layer 90 in the illustrated embodiment, the electrical interconnect/routing and the patterned mirror layer may be formed from separately deposited layers in other embodiments. It will be appreciated that the electrical interconnect/routing 202 and the patterned mirror layer 14 are formed of the same material.

Typically, a wet etching process (e.g., using phosphoric acid) is used to pattern the reflective layer 90 to form the patterned mirror 14. As described above, a cap layer of $Al_2O_3$ can be deposited over the dielectric layer of the optical stack 16. During such a wet etching process, the wet etchant (e.g., phosphoric acid) can also etch the $Al_2O_3$ cap layer. The etching of the $Al_2O_3$ exposes the silicon dioxide dielectric underneath in the interconnect region. Typically, during the wet etching process used to pattern the reflective layer 90, the etch rate of the layer 90 in the image or display area is faster than the etch rate of the layer 90 in the interconnect region due to the galvanic effect caused by the conductive sacrificial layer 82 underneath the reflective layer in the image or display area. As the etch rate of the reflective layer 90 in the interconnect region is slower than the etch rate of the reflective layer 90 in the image area, complete etching (without overetch) of the reflective layer 90 in the image area would result in "incomplete" patterning of the reflective layer 90 in the interconnect area to form the interconnect/routing 202. The skilled artisan will readily appreciate that such "incomplete" etching leads to shorting. Similarly, if the reflective layer 90 is etched "completely" to form the interconnect/routing, the galvanic effect causes overetching of the reflective layer 90 in the image area.

According to this embodiment, the thin film 64 also functions as an etch stop layer to protect the $Al_2O_3$ of the optical stack 16 in the interconnect region during etching of the reflective layer 90. As the thin film 64 preferably comprises a metal, the thin film 64 also provides the galvanic effect in the interconnect region. The galvanic effect in both the interconnect region and the image area results in uniform etch rates of the reflective layer 90 in both the interconnect region and the image area. Thus, according to this embodiment, the reflective layer 90 is etched completely to form the interconnect/routing 202 and the patterned mirror layer 14. It will be understood that the thin film 64 is not necessary in the image or display area to provide the galvanic effect because the sacrificial layer 82, which is formed of a metal, can provide the galvanic effect. It will be understood that, in an alternative embodiment, if the thin film 64 comprises amorphous silicon and the sacrificial layer 82 comprises a metal, the thin film 64 is deposited in both the image or display area as well as the interconnect region to negate the galvanic effect provided by the metal sacrificial layer 82.

As illustrated in FIG. 8G, a second sacrificial layer 196 is deposited over the entire structure, over both the patterned mirror layer 14 in the image area as well as over the interconnect/routing 202. While referred to herein as a "second" sacrificial layer 196, it will be understood that it may in fact represent the fourth deposition of sacrificial material, due to the use of three depositions to define the three cavity heights. Preferably, the second sacrificial layer 196 is formed from the same material as the first sacrificial layer 82, or, alternatively, is etchable selectively with respect to the surrounding materials by the same etchant (preferably a fluorine-based etchant) as the first sacrificial layer 82. As illustrated in FIG. 8H, the second sacrificial layer 196 and the thin film 64 are patterned and tapered apertures 86 are formed and extend through the second sacrificial layer 196, the first sacrificial layer 82, and the thin film 64, thereby patterning the sacrificial layers 196, 82 and the thin film 64.

Figure 8I:
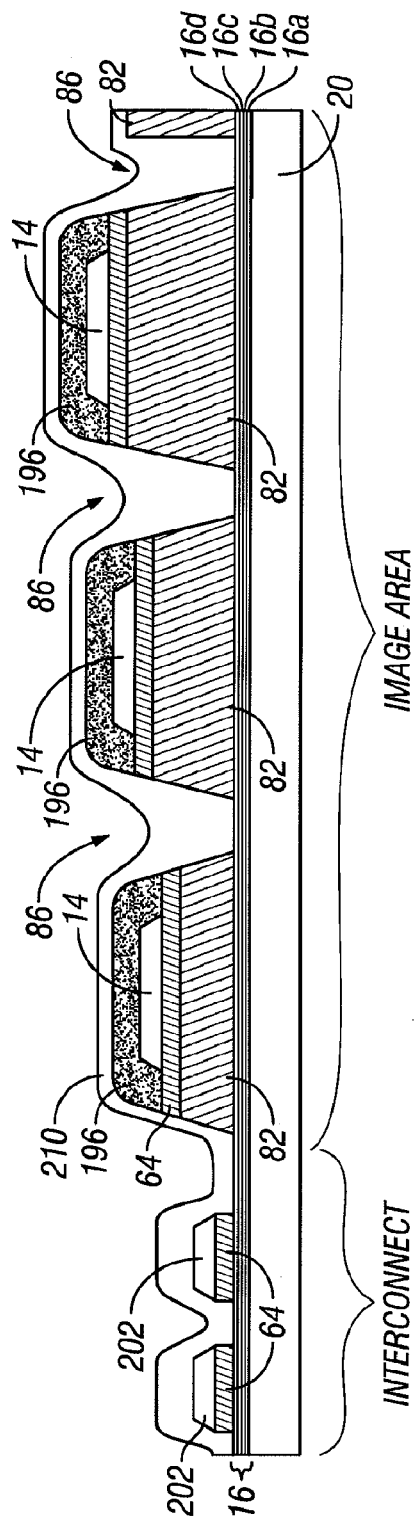
Figure 8J:
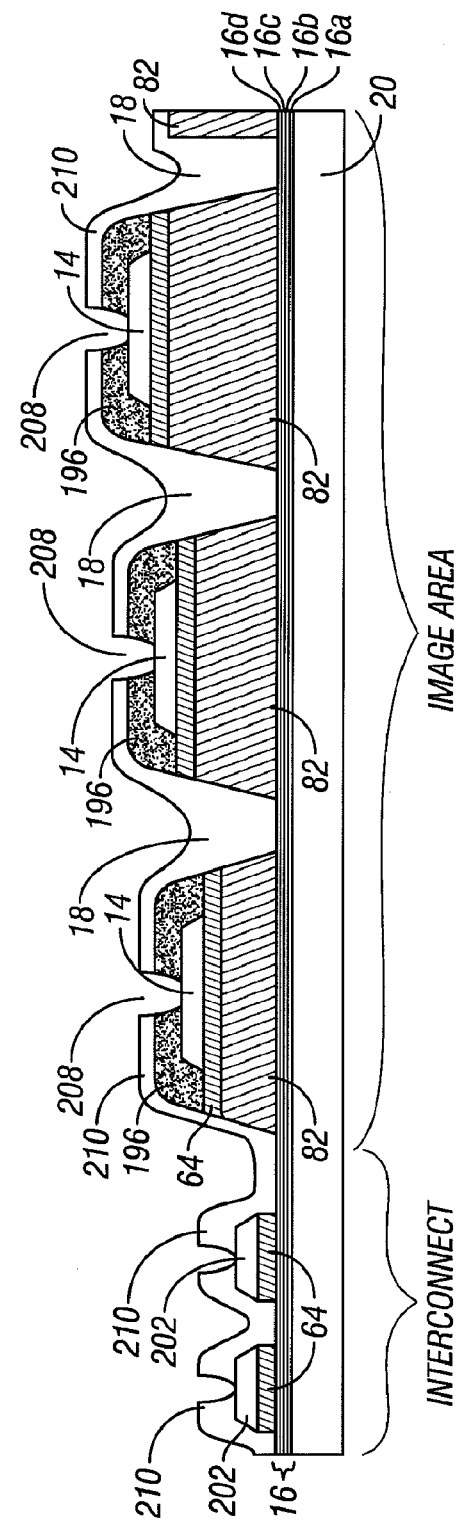

As shown in FIG. 8I, a post material 210 is deposited over the entire structure. It will be understood that the post material 210 comprises an organic or inorganic material, but preferably comprises an inorganic material (e.g., oxide, particularly $SiO_2$). As illustrated in FIG. 8J, this post oxide material 210 is then patterned to form supports 18 for the device in the image or display area. It can also be seen in FIG. 8J that apertures 208 are formed in portions of the second sacrificial layer 196 overlying the patterned mirror layer 14, exposing at least a portion of the patterned mirror layer 14. In the interconnect region, the post material 210 is patterned to expose portions of the interconnect 202 to form contacts, as will be described below. The skilled artisan will appreciate that the post material 210 can also be patterned to passivate the interconnect/routing 202.

As shown in FIG. 8K, a mechanical layer 92 is deposited over the patterned post material 210 and exposed portions of the patterned mirror layer 14. According to a preferred embodiment, the mechanical layer 92 is formed of nickel. In particular, it can be seen that the mechanical layer 92 at least partially fills the aperture 208 (FIG. 8I) such that a connector portion 204 connecting the mechanical layer 92 and the patterned mirror layer 14 is formed. As illustrated in FIG. 8K, the mechanical layer 92 contacts the interconnects 202 in the interconnect region in the exposed areas where the post material 210 is removed (FIG. 8J). As shown in FIG. 8L, the mechanical layer 92 is then patterned to form the column electrodes described above. The skilled artisan will appreciate that small holes (not shown) are preferably also etched in the mechanical layer 92 to aid removal of the sacrificial layers 82, 196 by a release etch, using a release etchant, as described below.

Figure 8M:
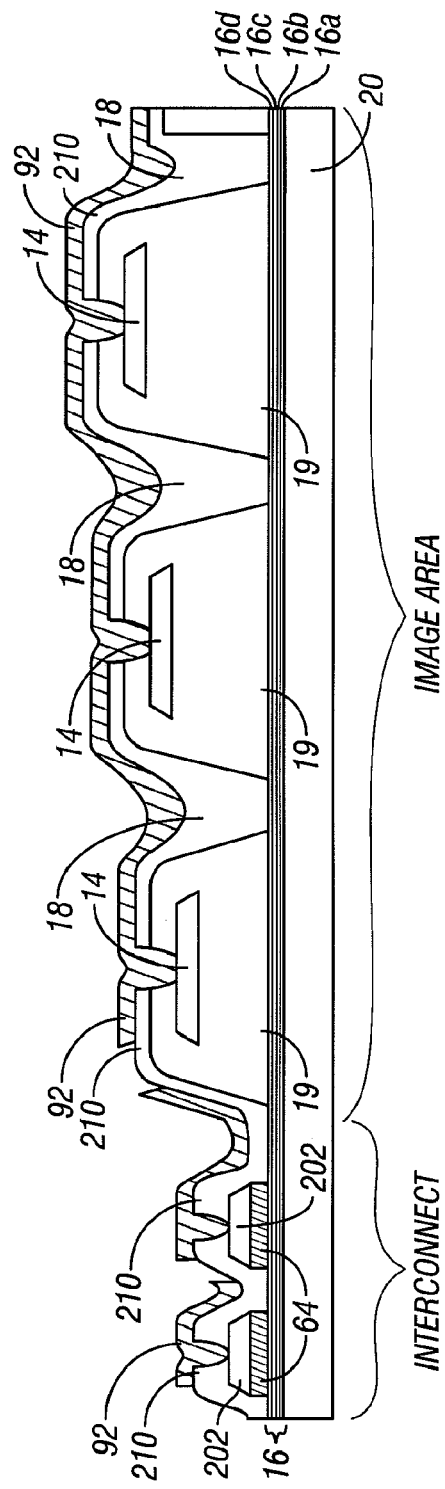
Figure 8N:
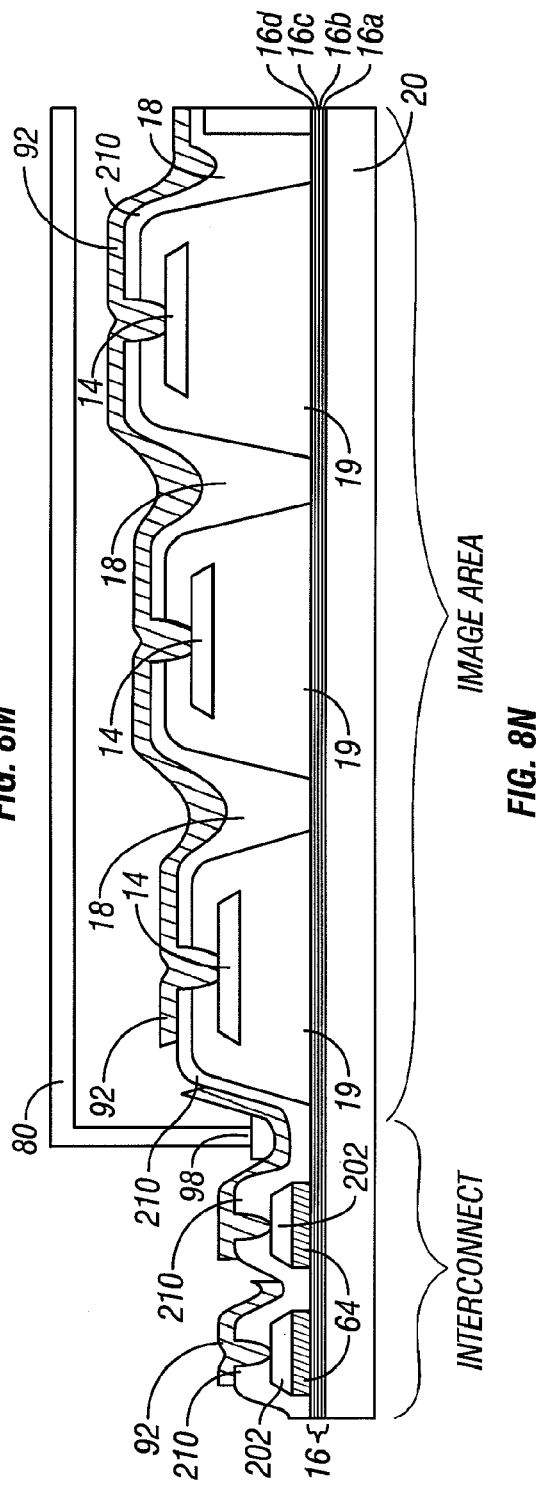

As discussed above, an interferometric modulator is configured to reflect light through the transparent substrate and includes moving parts, such as the movable patterned mirror 14. Therefore, to allow such moving parts to move, a gap or cavity 19 (as illustrated in FIG. 8M) is preferably created between the electrodes of the optical stack 16 and the patterned mirror 14 by selectively removing the sacrificial layers 82, 196 (and the thin film 64) in the image (or "array" or "display") area to create the cavity 19 (FIG. 8M), which will be described in more detail below. The gap or cavity 19 allows the mechanical parts, such as the movable mirror 14, of the interferometric modulator to move.

As illustrated in FIG. 8M, after the mechanical layer 92 is formed, a release etch is performed to remove both the first sacrificial layer 82 and the second sacrificial layer 196 as well as the thin film 64 in the image area, thereby forming an optical gap or cavity 19 between the patterned mirror layer 14 and the optical stack 16. Thus, an optical MEMS device is formed, which includes a mechanical layer 92 from which a patterned mirror layer 14 is suspended, where the patterned mirror layer 14 is partially detached from the mechanical layer 92. Standard release techniques may be used to remove the sacrificial layers 82, 196 and the thin film 64 in the image or display area. The particular release technique will depend on the material to be removed. For example, fluorine-based etchants, and preferably xenon difluoride ($XeF_2$), may be used to remove molybdenum (illustrated), tungsten, or titanium to create the cavity 19. It can be seen in FIG. 8M that the post oxide material 210 and the mechanical layer material 92 protects the interconnect/routing 202 from the release etch, including the underlying remaining thin film 64, which would be otherwise susceptible to the release etch.

The illustrated MEMS device thus includes an electrical interconnect or routing 202, which electrically connects circuitry outside the array with the electrodes 14, 16 within the array. It will be understood that the electrical connectivity path between the electrical interconnect/routing 202 and the mirror layer electrode 14 is through the mechanical layer 92 and the electrical connectivity path between the electrical interconnect/routing 202 and the ITO 16a of the optical stack 16 is through patterned apertures through the layers 16b-d of the optical stack 16. The interconnect/routing 202 is formed by patterning the reflective layer 90, which preferably comprises aluminum. It will be understood that, in this embodiment, the same material used to form the patterned mirror layer 14 is used to form the electrical interconnect/routing 202.

The skilled artisan will appreciate aluminum (of the movable layer 14) forms a poor and unreliable electrical contact with the ITO (of the electrodes of the optical stack 16), and that this electrical contact structure can be made stable and reliable by adding a barrier formed of a refractory metal (e.g., molybdenum, tungsten, or titanium, or a suitable alloy), between the aluminum and ITO. The illustrated thin film 64 (preferably comprising molybdenum) remaining in the interconnect region between the movable layer 14 and the optical stack 16 improves both the contact resistance and reliability. The skilled artisan will also appreciate that molybdenum may also be used for electrical contacts across scribe edges and is sufficiently resistant to corrosion that it may be left exposed at the edges.

After the release etch, a backplate 80 is preferably sealed to the transparent substrate 20 using a seal 98 to further protect the display area of the device. As shown in FIG. 8N, the seal 98 is in the area of the peripheral routing/interconnect 202. The movable layer 14 extends under the seal 98 and leads to contact pads in the "pad" region where row/column drivers are mounted. It will be understood that, as noted above, the figures are not drawn to scale.

The backplate 80 protects the interferometric modulator from harmful elements in the environment. Similarly, the seal 98 is preferably a hermetic seal for preventing water vapor and other contaminants from entering the package and damaging the interferometric modulator. The skilled artisan will understand that transparent substrate 20 may be any transparent substance capable of having thin film, MEMS devices built upon it. Such transparent substances include, but are not limited to, glass, plastic, and transparent polymers. Images are displayed through the transparent substrate 20.

It will be understood that, in the embodiments described herein, a reflective material is deposited between the electrode of the optical stack and the mechanical layer to form an upper electrode and the same layer of reflective material is also used for an electrical interconnect or routing. This optical MEMS device may be, for example, an interferometric modulator such as that described with respect to FIGS. 7C-7E and elsewhere throughout the application. The skilled artisan will understand that in non-optical MEMS devices, the suspended upper electrode need not be reflective.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

We claim:

1. A method of forming a microelectromechanical systems device, comprising:
   providing an electrode in an array region;
   depositing a sacrificial layer over the electrode in the array region;
   depositing a thin film over the sacrificial layer and in an interconnect region;
   forming a movable layer over the thin film; and
   forming an electrical interconnect layer over the thin film in the interconnect region, wherein the electrical interconnect layer comprises a same material as the movable layer.

2. The method of claim 1, further comprising forming a mechanical layer over the movable layer.

3. The method of claim 1, wherein forming the electrical interconnect layer includes simultaneously etching the electrical interconnect layer and the movable layer using a first etchant.

4. The method of claim 3, wherein the thin film is substantially resistant to etching by the first etchant.

5. The method of claim 4, wherein the thin film is under the electrical interconnect layer and the movable layer during simultaneous etching.

6. The method of claim 1, wherein the thin film comprises molybdenum.

7. The method of claim 1, wherein the sacrificial layer comprises molybdenum.

8. The method of claim 1, further comprising performing a release etch to remove the sacrificial layer to form an optical cavity.

9. The method of claim 8, wherein the release etch also removes the thin film.

10. The method of claim 8, further comprising protecting the electrical interconnect and the thin film in the array region from the release etch with an inorganic dielectric material.

11. The method of claim 1, wherein the electrical interconnect layer comprises aluminum.

12. The method of claim 1, wherein depositing the thin film is conducted before forming the movable layer.

13. The method of claim 1, wherein the device is an interferometric modulator.

* * * * *

UNITED STATES PATENT AND TRADEMARK OFFICE
CERTIFICATE OF CORRECTION

| | |
|---|---|
| PATENT NO. | : 8,097,174 B2 |
| APPLICATION NO. | : 12/764454 |
| DATED | : January 17, 2012 |
| INVENTOR(S) | : Wonsuk Chung, SuryaPrakash Ganti and Stephen Zee |

It is certified that error appears in the above-identified patent and that said Letters Patent is hereby corrected as shown below:

In the drawings: At Sheet 8 of 14 (FIG. 8A), approximately line 2, please add --16{-- to the left of the structure designated by 16a-d.

In the drawings: At Sheet 8 of 14 (FIG. 8B), approximately line 3, please add --16{-- to the left of the structure designated by 16a-d.

Signed and Sealed this
Fifth Day of June, 2012

David J. Kappos
*Director of the United States Patent and Trademark Office*